Feb. 10, 1942.  R. D. HULSLANDER  2,272,894
APPARATUS FOR MOUNTING VALVE STEMS ON INNER TUBES
Filed Oct. 16, 1939  5 Sheets-Sheet 1

INVENTOR
Ray D. Hulslander
Ely + Frye
BY
ATTORNEYS

Feb. 10, 1942.　　R. D. HULSLANDER　　2,272,894
APPARATUS FOR MOUNTING VALVE STEMS ON INNER TUBES
Filed Oct. 16, 1939　　5 Sheets-Sheet 2
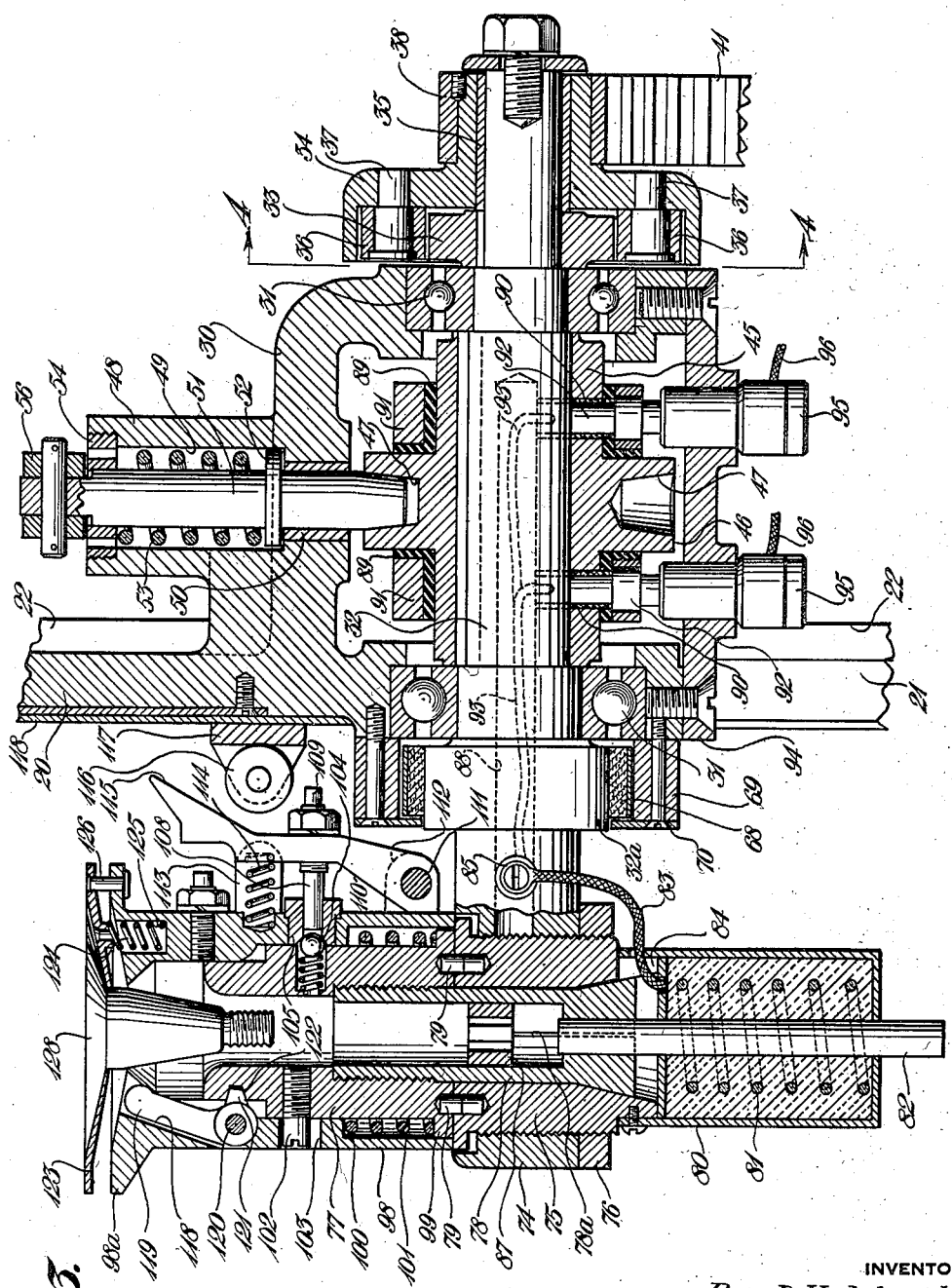
INVENTOR
Ray D. Hulslander
BY
ATTORNEYS

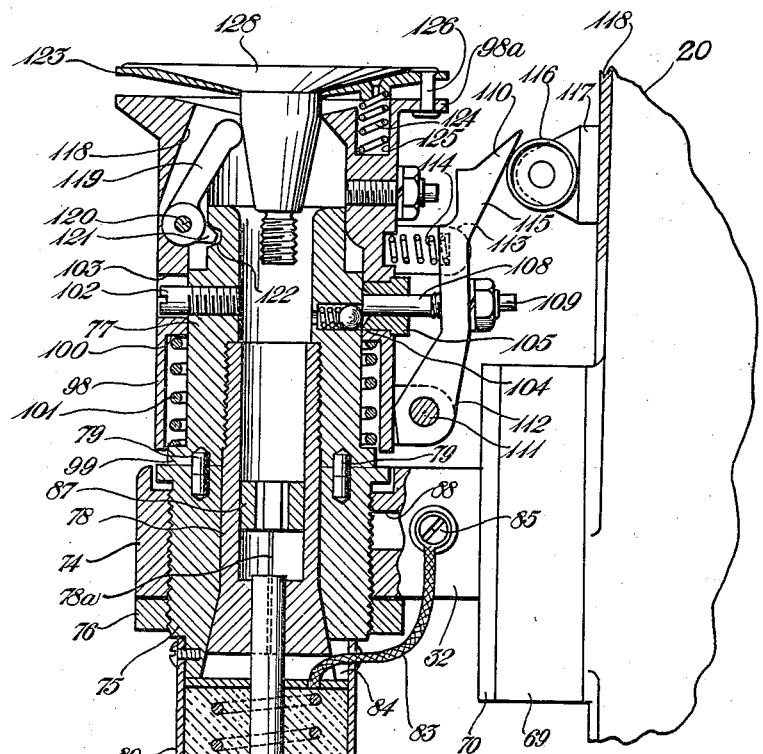
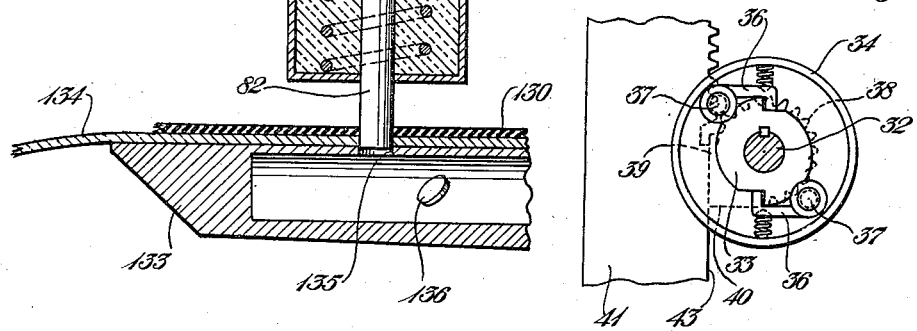

Feb. 10, 1942. R. D. HULSLANDER 2,272,894
APPARATUS FOR MOUNTING VALVE STEMS ON INNER TUBES
Filed Oct. 16, 1939 5 Sheets—Sheet 4
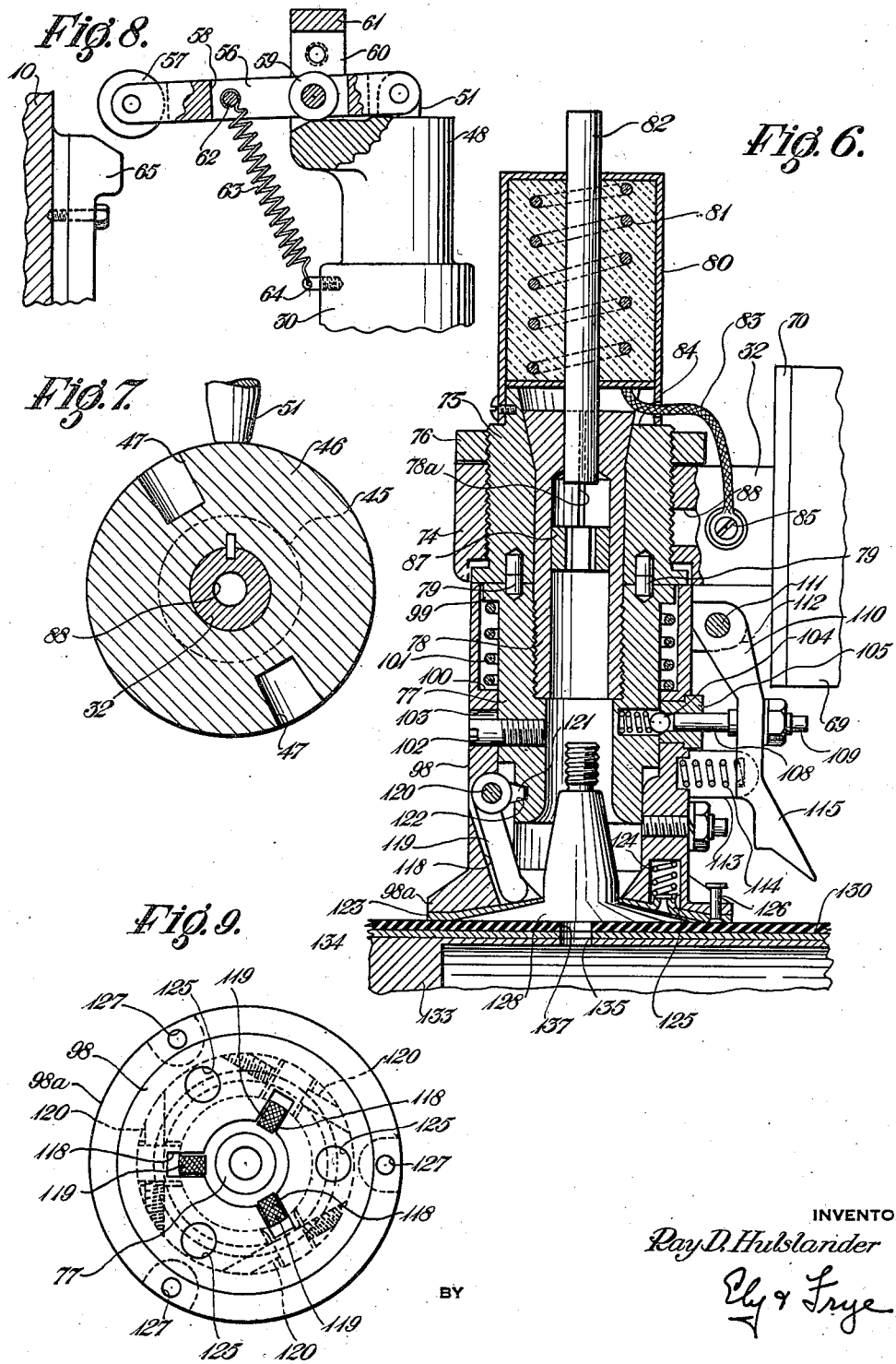
INVENTOR
Ray D. Hulslander
BY
Ely & Frye
ATTORNEYS

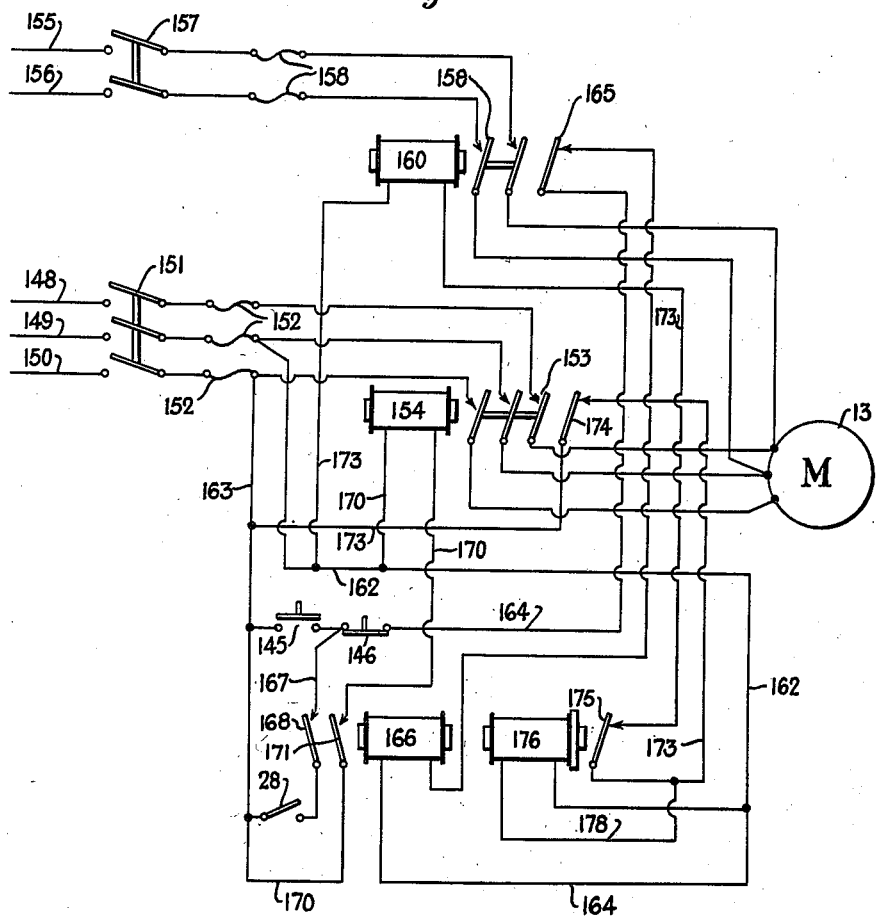

Patented Feb. 10, 1942

2,272,894

UNITED STATES PATENT OFFICE 2,272,894

APPARATUS FOR MOUNTING VALVE STEMS ON INNER TUBES

Ray D. Hulslander, Akron, Ohio, assignor to The Firestone Tire & Rubber Company, Akron, Ohio, a corporation of Ohio Application October 16, 1939, Serial No. 299,681

14 Claims. (Cl. 154—9)

This invention relates to apparatus for mounting valve stems on inner tubes and the like, and more especially it relates to apparatus capable of cyclic operation for performing the successive operations of forming an aperture in the wall of a rubber tube and thereafter mounting a valve stem on the tube over said aperture.

The chief objects of the invention are to conserve time and labor in the manufacture of inner tubes for pneumatic tires; to produce a superior product by effecting accurate registry of the aperture in the tube wall with the axial passage in the valve stem; and to press the base flange of the valve stem firmly into adhesive engagement with the tube wall concurrently with the application of the valve stem to the latter. Other objects will be manifest as the description proceeds.

Of the accompanying drawings—

Figure 3 is a fragmentary vertical section through a slide, and mechanism carried thereby including a punch and a chuck, and a rubber valve stem positioned within the latter, the respective mechanisms being shown in inoperative position;

Figure 4 is a section on the line 4—4 of Figure 3, on a smaller scale, showing the mechanism as it appears when the slide is in partly lowered position;

Figure 5 is a vertical section through the punch and chuck as they appear during the operation of punching an aperture in the wall of a rubber tube;

Figure 6 is a section similar to Figure 5 showing the structure in inverted position as it appears during the operation of applying a valve stem to an apertured tube structure;

Figure 7 is a sectional view of the index collar of the apparatus, as it appears during a rotative place of operation; and Figure 8 is a detail elevation of detent operating mechanism, parts being broken away and in section;

Figure 9 is a plan view of the chuck portion of the apparatus, with presser pad removed for clearness of illustration; and Fig. 10 is a wiring diagram of the motor of the apparatus and its controls.

Briefly stated, the apparatus of the invention comprises a vertically reciprocable slide in which is journaled a horizontal shaft, the forward end of the latter carrying a structure disposed transversely thereof, one end of said structure consisting of a punch, the other end of the structure consisting of a chuck that is co-axial with said punch and adapted to receive and grip a rubber valve stem. Mechanism is provided for rotating the shaft through 180° during the latter part of each rising movement of the slide, the shaft being held against rotation during the entire downward movement of the slide. Thus the structure carried on the end of the shaft is enabled to present first its punch-end to the work, and then to present its chuck-end thereto for applying the valve stem to the work over the aperture formed therein by the punch. Thus it requires two reciprocations of the slide to effect a cycle of operation, and means is provided for stopping the operation of the machine after each cycle is completed, the starting thereof being performed manually, when the operator is ready.

Figure 1:
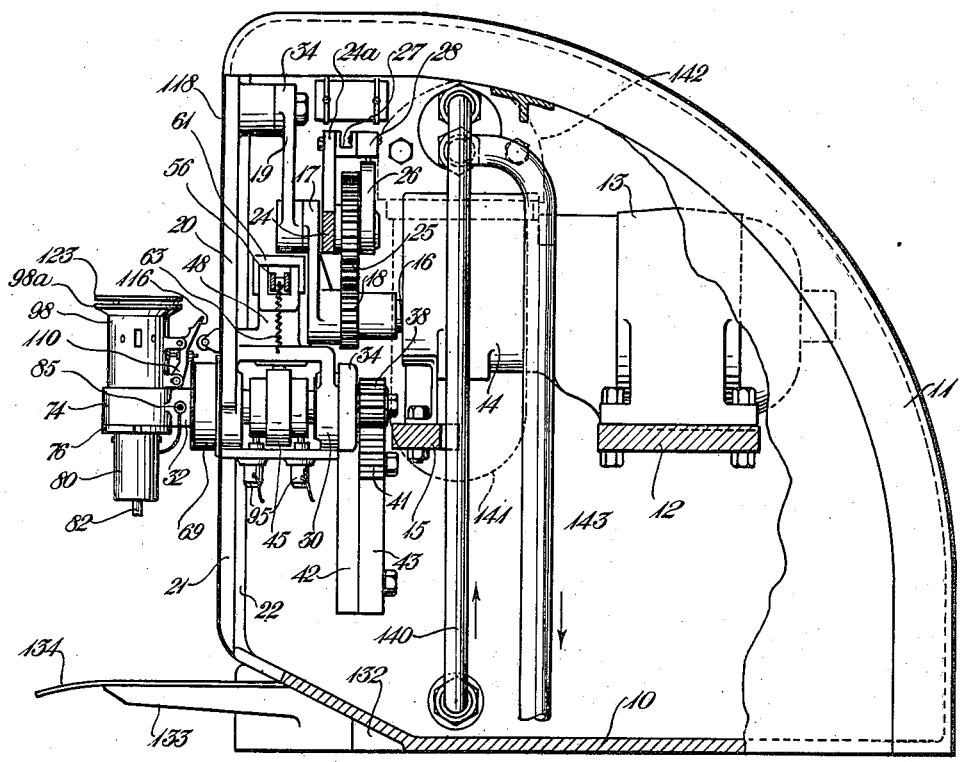
Figure 1 is a side elevation of apparatus embodying the invention, in inoperative position, a portion of the housing structure being broken away and in section to reveal enclosed mechanism.
Figure 2:
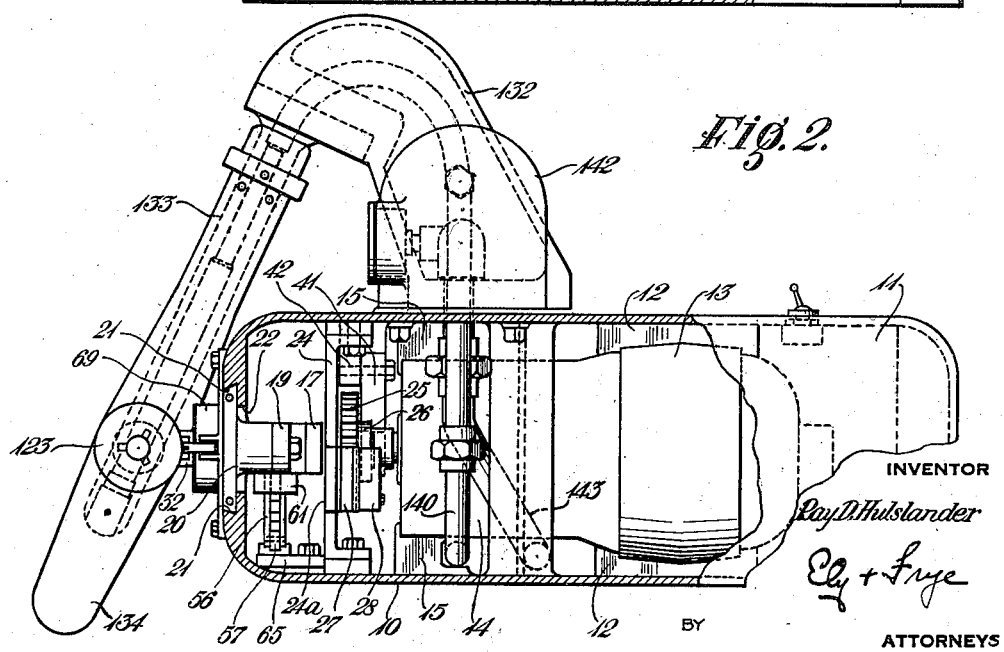
Figure 2 is a plan view of the apparatus shown in Figure 1, a portion of the housing structure being broken away.

Referring now to the drawings, especially Figures 1 and 2 thereof, it will be seen that the apparatus comprises a housing 10 that consists of a metal casting having base, front, and lateral walls, the top and rear margins of the lateral walls being arcuate, and supporting a removable cover 11. The housing is mounted upon any suitable stand or table (not shown) the latter being of such height that the apparatus is conveniently positioned for manual operation. Mounted within the housing upon brackets 12, 12 that project from the respective lateral walls thereof is a motor 13, which motor includes a reduction gear device 14 mounted upon an end thereof, the reduction gear device being supported upon brackets 15, 15 projecting from the lateral walls of the housing. The drive shaft 16 of the reduction gear device projects forwardly therefrom and carries thereon a crank 17, there being a gear 18 mounted upon the hub portion of said crank. The free end of the crank 17 is pivotally connected to one end of a pitman or link 19, the other end of which is pivotally connected to the upper end of a slide 20 that is mounted for vertical movement in dovetail slideways 21 that are formed on the front wall of the housing 10 at each side of a central vertical slot or opening 22 therein. The arrangement is such that rotation of the crank 17 will lower and raise the slide 20.

Secured to opposite lateral walls of the housing 10 is a bracket 24 that spans the interior of the housing, above the drive shaft 16. Journaled upon a suitable stub shaft projecting laterally from the bracket 24 is a pinion 25 that is meshed with gear 18, and has twice as many teeth as the latter, the arrangement requiring two revolutions of gear 18 to effect one revolution of pinion 25. Mounted upon the hub of pinion 25 is a cam 26 that is affixed thereto and which projects beyond the perimeter of said pinion. The bracket 24 is formed locally with an upward extension 24a, and secured to a lateral face thereof, over the pinion 25 is a spacer block 27. Secured to the lateral face of spacer block 27 is an electrical limit switch 28, the operating plunger of which projects downwardly into the orbit of the cam 26 so as to be operated thereby upon each revolution of said cam. The switch 28 is in the electrical circuit of the motor 13, and is so constructed and arranged as to open said electrical circuit when its plunger is operated, and thereby automatically to effect the stopping of operation of said motor. The electrical circuit of the motor (Figure 10) also includes "start" and "stop" switches 145 and 146, respectively, for manual operation by an operator as presently will be described.

The slide 20 is formed on its rear, at the bottom thereof, with a bracket portion 30 that is disposed interiorly of the housing 10, and carries spaced apart bearings 31, 31, Figure 3, which bearings support a horizontal shaft 32 that extends beyond both ends of said bracket. The shaft 32 is arranged to be rotated half a revolution in determinate time relation to the raising and lowering of the slide 20, and to this end has a ratchet 33 keyed thereon, immediately behind the bracket 30. Beside the ratchet 33 the shaft has journaled thereon a ratchet cup 34 that encircles said ratchet 33, there being a bearing bushing 35, Figure 3, between the shaft and ratchet cup. The ratchet 33 is formed with two teeth disposed 180° apart, which teeth are adapted for engagement with a similarly positioned pair of spring-pressed pawls 36, 36, that are mounted upon respective pivot pins 37 carried by the ratchet cup 34. The arrangement is such that when the ratchet cup 34 is turned angularly in counter-clockwise direction as viewed in Figure 4, the pawls 36 will engage the teeth of ratchet 33 and turn the latter and shaft 32 similarly in counter-clockwise direction. Where the ratchet cup is moved in clockwise direction the pawls slide over the ratchet and no movement of the latter results.

For effecting angular movement of the ratchet cup 34 about its axis, a pinion 38 is mounted upon the hub portion of said ratchet cup. The pinion 38 is formed with gear teeth only on about two-thirds of its perimeter, the remainder of the latter consisting of two plane faces 39, 40, Figure 4, disposed at right angles to each other. Cooperating with the pinion 38 is a vertically disposed rack 41 that is mounted upon a bracket-like formation 42 extending from one of the lateral walls of the housing 10. The rack 41 is formed with teeth only at its upper end and has a plane surface 43 below said teeth, the number of teeth on the rack being sufficient to impart a little over 180° of movement to the pinion 38. In the downward movement of the slide 20, the pinion is rotated in clockwise direction by the rack 41 until the plane face 39 of the pinion 38 rests flush against the plane surface 43 of the rack 41 below the teeth of the latter. This occurs when the slide is about midway of its descending movement, the pinion thereafter sliding along said rack face 43 without further angular movement. The procedure is reversed during the rising movement of the slide, the teeth of pinion 38 then being engaged by the rack teeth, midway of said rising movement, with the result that said gear and the ratchet cup 34 are rotated counter-clockwise through a little over 180°, the pawls 36 thereby engaging ratchet 33 and turning the latter, and the shaft 32, through a half-revolution. During the latter operation there may be a little lost motion of the ratchet cup before the pawls 36 engage the teeth of ratchet 33.

To assure that the shaft 32 when stationary always will be securely held in one of two determinate angular positions exactly 180° apart, an index collar 45 is keyed upon said shaft between the bearings 31. The collar 45 is formed with a medial circumferential flange 46, which flange is formed with two slightly tapered sockets 47, 47 extending radially inwardly from the perimeter of said flange at diametrically opposite points thereof. Formed on the top of bracket portion 30 of slide 20 is an upstanding boss 48 that is formed with an axial bore 49, the lower end of said bore being of smaller diameter and provided with a tubular bushing 50. Mounted in the bore 49 and extending slidably through bushing 50 is a generally cylindrical detent 51, the lower end portion of which is tapered complemental to the taper of sockets 47 of index collar 45, in which sockets the tapered end of the detent is receivable. Above the bushing 50 the detent is formed with a circumferential flange 52, and mounted upon the detent above said flange is a compression spring 53. The lower end of spring 53 bears against flange 52 and its upper end bears against a plug 54 that is threaded into the bore 49 at the upper end thereof, the arrangement being such that the spring normally urges the detent downwardly. The plug 54 is axially apertured to enable the detent 51 to extend therethrough.

It is required that the detent 51 be lifted out of engagement with the sockets 47 of the index collar 45 during those intervals that the shaft 32 is being rotated, the means for effecting such movement being best shown in Figure 8. As shown in said figure, an operating lever 56 is pivotally connected to the upper end of the detent, and extends laterally therefrom toward a side-wall of the housing 10, the free end of said lever being provided with a cam roller 57. The medial region of the lever 56 is slotted at 58, and mounted in said slot is a roller 59 that normally rests upon the top of the boss 48, between a pair of upstanding guide-arms, such as the arm 60. A U-shaped guard plate 61 is mounted upon the top of arm 60 and spans the slot therebetween. Spanning the slot 58 in the lever is a pin 62 to which one end of a tension spring 63 is connected, the other end of the spring being connected to a stud 64 that projects from bracket portion 30 of slide 20. The lever 56 moves with the slide 20 as the latter is raised and lowered, and a cam 65 is mounted upon the sidewall of the housing 10 in position to engage the cam roller 57 as the slide is raised and lowered. The arrangement is such that as the slide descends, the cam roller 57 engages the cam 65 with the result that the lever 56 is lifted, against the tension of spring 63, sufficiently to enable the cam roller to pass the cam, the lever swinging about its pivotal connection to the detent 51. The spring restores the lever 56 to the normal position shown after the cam roller has passed the cam. Upon rising movement of the slide, the cam roller again engages the cam 65, thus causing the lever 56 to tilt about the axis of roller 59 as a fulcrum with the result that the end of the lever connected to detent 51 is elevated, and the latter lifted axially against the pressure of spring 53. The detent is thereby withdrawn from engagement with the index collar 45, such withdrawal occurring before the shaft 32 starts rotating. Tilting of the lever 56 as described enables the cam roller 57 to pass the cam 65, the spring 53 thereafter moving the detent 51 downwardly toward normal position. The shaft 32 at this time has not yet completed 180° of angular movement so that the detent will engage the periphery of the index collar flange 46, and ride thereon as shown in Figure 7 until further movement of the collar brings a socket 47 thereof into registry with the detent, the latter then moving into said socket, thereby holding the shaft in determinate angular position.

That portion of the shaft 32 that projects forwardly of the slide 20 is formed with an enlarged flange portion 32a that is located immediately in front of the front bearing 31, and embracing said flange portion is a brake band 68. The latter is supported by a circumscribing retainer ring 69 that is secured to the front of the slide, said ring including any suitable means not shown for adjusting the pressure of the brake band against the shaft. A closure plate 70 is secured to the front of the retainer ring to conceal the edge of the brake band. The brake assists in preventing over-run of the shaft during its rotative phases.

At its forward extremity the shaft 32 carries the punch and chuck structure, and to this end the terminal portion of the shaft is formed integrally with a ring-shaped head 74, the axis of which is disposed transversely of the axis of the shaft, and always is in vertical position except during rotation of the shaft. The head 74 is interiorly threaded to receive a quill 75, the latter extending through the head and having a locknut 76 threaded onto its projecting portion. Mounted upon the opposite end of the quill 75 from the nut 76 is a co-axial tubular chuck barrel 77, which barrel is secured to the quill by means of a tubular collet 78 that extends through the quill, axially thereof, and is threaded into the bore of said chuck barrel. Dowel pins 79 between the quill and the chuck barrel prevent relative angular movement of said members. The non-threaded end portion of the collet is flared and fits into a complementally tapered socket in the quill, there being a plurality of kerfs or narrow slots 78a extending longitudinally of the collet for some distance from the flared end thereof. A socketed member 87 is secured in the axial bore of the collet for receiving a socket wrench by means of which the collet may be rotated to thread it into the chuck barrel 77. The end portion of the quill 75 beyond the nut 76 is of somewhat reduced diameter, and secured to said reduced portion is a generally cylindrical metal cup 80 in which is mounted an electrical heating element 81. Axially mounted in said heating element is a cylindrical punch 82 that projects therefrom through the cup 80 at both ends thereof, the inner end of the punch extending into the tubular collet 78 and being gripped thereby, the arrangement providing means for adjusting the axial position of the punch, and for removing the same when desired. Electric current for heating the element 81 is conducted thereto by a pair of conductive wires, such as the wire 83, Figures 1, 3, 5 and 6, which wires extend through a suitable recess 84 formed in the cup 80 and reduced portion of the quill, said wires extending to suitable terminals 85 provided on the shaft 32 on opposite sides thereof adjacent the head 74. The arrangement is such that the heating element heats the punch 82.

For supplying electric current to the conductors 83, the shaft 32 is provided with an axial bore 88 that extends from the head 74 into the region of the index collar 45. Mounted upon the latter and abutting opposite sides of the flange 46 thereof are respective insulator rings 89, 89, and extending radially through the shaft 32, from the axial bore 88, and through the index collar 45 and insulator rings 89, are respective bores in each of which is mounted a tubular insulator sleeve 90. Mounted upon each insulator ring 89 is a metal contact ring 91, and each of the latter is radially apertured, in alignment with a sleeve 90, to receive a metal terminal member 92 that extends to the axial bore 88 of the shaft 32. Within the shaft bore 88 are conductor wires 93, 93 that are connected at one end to the respective terminals 85 and at their other ends are soldered to the inner ends of the respective terminal members 92. Secured to the bottom of bracket portion 30 of the slide is a bracket or plate 94 that supports a pair of electrical brushes 95, 95 that bear against the periphery of the respective contact rings 91, there being respective conductor wires 96 extending from said brushes to any convenient source of electric power (not shown). The arrangement is such as to effect the heating of the punch 82 at all angular positions of the shaft 32.

Slidably mounted for limited axial movement upon the chuck barrel 77 is a tubular chuck cup 98. The chuck barrel is formed with an external peripheral flange 99 at its base, and the chuck cup is formed interiorly with a circumferential shoulder 100, and a compression spring 101 is mounted between said chuck barrel and chuck cup with its ends engaging said flange 99 and shoulder 100 respectively for urging said chuck cup 98 axially, outwardly of the chuck barrel 77. Relative axial movement of the chuck barrel 77 and chuck cup 98 is limited by means of a stud 102 that projects through a short longitudinally extending slot 103 in the chuck cup 98 and is threaded into the chuck barrel. For retaining the chuck cup 98 in its innermost position, as shown in Figures 1, 3 and 6, a spring-backed ball detent 104 is mounted in a suitable radial bore in the chuck barrel 77, on the side thereof nearest the housing 10, said ball normally being urged outwardly, and being engageable in a socket formed in the inner end of a tubular bushing 105 that is threaded radially through the wall of the chuck cup 98. When the detent 104 is seated in the socket in bushing 105, it intersects the abutting faces of chuck cup and chuck barrel, thus preventing relative axial movement thereof.

By moving the detent 104 inwardly, against the pressure of its backing spring, the detent may be positioned entirely within the chuck barrel structure and thereby enable the chuck cup 98, under impetus of spring 101, to move outwardly relatively of the chuck barrel, to the extent permitted by the stud 102. For so moving the detent 104 inwardly, a pin or plunger 108 is slidably mounted in the bushing 105, the inner end of said pin abutting the detent 105, the outer end of the pin projecting beyond the outer end of the bushing, and being engaged by a stud 109 that is adjustably mounted in the medial region of a lever 110. The latter is pivotally mounted at one end upon a pivot pin 111 carried by a pair of ears, such as the ear 112, that are formed on the chuck cup 98, the pivoted end portion of the lever being so shaped as to limit the angular movement of the lever in the direction that carries its free end away from the head. On the other side of the stud 109 from the pivot pin 111 the lever is positioned between two guide-lugs, such as the lug 113, that are formed on the chuck cup 98, and a compression spring 114 engaging the latter and the lever, between said guide lugs 113, normally urges the free end of the lever away from the head to the extent permitted by the formation at the pivoted end of the lever. The outwardly directed marginal face of the lever 110, at the free end thereof, is formed with an oblique cam surface 115 that is engageable, upon occasion as subsequently will be explained, with a cam roller 116 that is journaled in a suitable bracket 117 carried upon a cover plate 118, the latter being secured to the front of the housing 10, in front of the slide 20. Cam roller 116 engages cam surface 115 of lever 110 when the chuck portion of the chuck and punch structure is uppermost and the slide 20 is moved downwardly, as shown in Figure 5; the free end of the lever thereby being moved toward the chuck structure and the pin 108 moved inwardly to press the detent 104 rearwardly, thereby to release the chuck cup and enable it to move axially under impetus of the spring 101. The spring 114 restores the lever to normal position when it is disengaged from the cam roller 116.

The upper end portion of the chuck cup 98 is radially slotted at 118, 118, said slots being three in number and opening into the axial bore of the cup. Positioned in slots 118 are respective chuck jaws 119 that are pivotally mounted at their ends remote from the outer end of the cup, upon respective tangentially disposed pivot pins 120. At their inner end, adjacent the pivot pin 120, each jaw 119 is formed with a tooth-shaped lug 121 that extends into a slot 122 formed tangentially in the peripheral face of the upper end portion of chuck barrel 77. The slots 122 are shaped similarly to the space between a pair of gear teeth, the arrangement being such that the free ends of the jaws 119 are moved between an inner, work-engaging position and an outer work-releasing position by reason of relative axial movement between chuck barrel 77 and chuck cup 98. Coaxially mounted upon the outer end of chuck cup 98 is an annular work seat or presser pad 123. The said pad normally is maintained in spaced relation to the chuck cup 98 by means of a plurality of compression springs 124 that seat in respective recesses 125 in the end of the chuck cup and bear against the back of the presser pad. Movement of the presser pad outwardly, under impetus of the springs 124 is limited by a plurality of headed studs 126, 126 that project rearwardly from the presser pad and slidingly extend through respective apertures 127, Figure 9, formed in a circumferential flange 98a formed on the outer end of the chuck cup 98. The presser pad 123 is adapted to support a rubber valve stem such as is shown at 128, Figures 3, 5, and 6, the valve stem being manually placed thereon with its stem portion projecting therethrough into the axial bore of the chuck cup 98.

The apparatus is adopted to apply the valve stem 128 to an unvulcanized rubber tube structure after the latter has been apertured by the heated punch 82, a portion of the rubber tube structure being shown at 130. The aperturing of the tube structure 130 requires the use of a die and a support for said tube and to this end a rigid, arcuate, hollow die arm bracket 132, Figure 2 is mounted upon one lateral wall of the housing 10, exteriorly thereof at its base. Upon the outer end of the bracket 132 is mounted a hollow die arm 133 that extends to a position directly beneath the chuck and punch structure, there being a thin, flat, metal die plate 134 mounted upon the top of the die arm and extending somewhat beyond the margin of the latter. The die arm and die plate are of such length and transverse area as readily to enable a substantial length of the end portion of tube 130 to be mounted thereon, with the die plate and die arm inside the tube. In exact axial alignment with the axis of the chuck and punch structure, the die plate and die arm are formed with a die aperture 135 of proper size to receive the punch 82, whereby a disc of tube material 136, Figure 5, is punched from the tube structure 130, thus to form an aperture 137, Figure 6, in the latter.

The discs 136 punched from the tube material 130 are removed from the interior of the hollow die arm 133 by suction, and to this end the outer end of said die arm is closed, as shown in Figure 5, and at its inner end its hollow interior is connected by a pipe 140 to a receptacle 141. The latter preferably is of transparent material, and is carried by a head 142 mounted upon one of the lateral walls of the housing 10, exteriorly thereof, said receptacle having fluid-tight connection with said head. The pipe 140 extends through the die arm bracket 132 and through the housing wall, rising interiorly of the housing and extending laterally into the head 142, with which it has fluid-tight connection. A second pipe 143 also has fluid tight connection with the head 142 and extends therefrom to a suitable source of suction (not shown). The arrangement is such that the discs 136 punched from the tube structures 130 are sucked from the die arm 133 and discharged from the pipe 140 into the receptacle 141 in which they are collected.

The wiring diagram of the motor 13 and its controls is of known construction, and is shown in Figure 10 to which reference now is directed. Electrical energy for driving the motor 13 is provided by power conductors 148, 149 and 150 that supply 440 volt, 3 phase, 60 cycle electric current to the motor, said conductors including a manually operable master switch 151, respective fuses 152, and a control switch 153 that is operated by a motor-control relay 154 as presently will be explained, said switch 154 being open in the inoperative condition of the apparatus. The motor 13 also is provided with dynamic braking that is operated by 125 volt direct electric current supplied by power conductors 155, 156, which conductors include a manually operated master switch 157, respective fuses 158, and a control switch 159 that is operated by a brake-control relay 160 as presently will be explained, said switch 159 being closed only at determinate time intervals as presently will be explained.

Connected to the power conductors 149, 150 are respective conductors 162, 163 of the motor control circuit. Connected to conductors 162, 163 is a circuit 164 that includes the normally open starting switch 145, the normally closed stop switch 146, a normally closed switch 165 that is controlled by relay 160, and a control relay 166, said switches and relay being arranged in series in said circuit. The circuit 164 has a holding circuit 167 connecting conductor 163 to conductor 164 between switches 145, 146 of the latter, said holding circuit including limit switch 28 and a normally open switch 168 that is controlled by relay 166, said switches 28 and 168 being arranged in series. Also connected to conductors 162, 163 is a circuit 170 that includes a normally open switch 171 controlled by relay 166, and the motor-control relay 154 aforementioned, said switch 171 and relay 154 being arranged in series. Also connecting conductors 162, 163 is a circuit 173 that includes a normally closed switch 174 controlled by relay 154, a normally closed switch 175 controlled by a time relay 176, and the brake-control relay 160 aforementioned, said switches and relay being arranged in series in said circuit. The time relay 176 is in a circuit 178 that is connected to conductor 162, and is connected to conductor 173 between switches 174, 175 therein. Switch 175 is opened by the time relay 176 shortly after the master switch 151 is closed.

The operation of the apparatus is as follows. Assuming the mechanism to be stationary in the position shown in Figures 1 and 2, with the heating element 81 energised to heat the punch 82, the switches 151, 157 closed, and the suction apparatus operating to create suction in the die arm 133, the operator first places a rubber valve stem 128 in inverted position upon the presser pad 123, and then mounts an end portion of an unvulcanized rubber tube upon the die arm 133, the suction in the latter creating a shallow dimple in the tube wall so that accurate positioning of the tube readily is achieved. The operator then presses the switch button 145 to set the apparatus in operation.

Closing of switch 145 energizes relay 166 and operation of the latter closes switches 168 and 171, the latter thereupon closing circuit 170 and energizing relay 154. Operation of the latter closes switch 153 and thus sets the motor 13 in operation, and opens switch 174, to open circuit 178 of the time relay 176. As the motor starts rotating, limit switch 28 closes, thus completing the holding circuit of relay 166. The apparatus then executes a cycle of operation and comes to a stop at the completion thereof.

The said cycle of operation starts when the motor 13 begins turning, which turning rotates the crank 17 and thereby moves the slide 20 downwardly. First result of downward movement of the slide is to carry lever 110 of the chuck into engagement with cam roller 116, thereby resulting in the moving inward of the free end of said lever and the depressing of plunger 108 to move the detent 104 out of its socket in bushing 105. This release the chuck cup 98 and spring 101 moves it axially upwardly, relatively of chuck barrel 77, as shown in Figure 5, thus swinging jaws 119 angularly on their pivots until the free ends of the jaws engage and grip the valve stem 128. Continued downward movement of the slide forces the heated punch 82 through the wall of tube 130 and through die aperture 135, thereby punching out the disc 136 which thereupon is removed by suction and deposited in the receptacle 141. Thereafter rising movement of the slide withdraws the punch 82 from the tube wall 130.

During the first part of the downward movement of the slide 20 the pinion 38 moved over the toothed portion of rack 41 and was rotated thereby a little over 180°, thereby effecting similar rotation of the ratchet cup 34 and pawls 36, the latter moving in the direction (clockwise as viewed in Figure 4) that caused them to ratchet over the teeth of the ratchet 33. As the pinion 38 passed beyond the teeth of the rack, the plane face 39 of the pinion came to rest against plane surface 43 of the rack, the pinion then sliding along the rack without further angular movement during the remainder of the descent of the slide. Also during descent of the slide the roller 57 on the end of lever 56 of the indexing detent 51 has passed the cam 65 on the wall of the housing, without effecting movement of said detent, and now is disposed below said cam.

Upon rising movement of the slide 20, the chuck and punch structure retains its position on a vertical axis until about midway of said rising movement, thereby enabling the punch readily to withdraw from the die. Almost midway of the slide's rise the roller 57 on lever 56 encounters cam 65, with the result that said lever pivots about its fulcrum on the roller 59 and thereby elevates the detent 51, against the force of spring 51, to withdraw the lower end of said detent from its socket 47 in index collar flange 46, thus effecting release of the shaft 32. Immediately thereafter pinion 38 engages the toothed portion of rack 41 and is rotated thereby in counterclockwise direction as viewed in Figure 4, thereby effecting similar rotation of the ratchet cup 34 and pawls 36. This movement of the latter causes them to engage the teeth of ratchet 49, and similarly to turn the ratchet and the shaft 32 upon which it is mounted. Movement of the shaft continues until it has turned 180°, at which time the slide has reached its uppermost position. The roller 57 in the meantime has passed the cam 55 and spring 53 has moved the detent downwardly into engagement with the periphery of index collar flange 46, as shown in Figure 7, the detent moving into a socket 47 in the latter as the shaft 32 completes its 180° of angular movement. The aforesaid angular movement of the shaft 32 reverses the position of the chuck and punch structure so that the punch is directed upwardly and the chuck is directed downwardly, with the valve stem 128 held in the lower extremity of the latter. The foregoing operations constitute one half a cycle of operation.

Continued operation of the motor again lowers the slide 20 in the manner previously described, thus lowering the chuck and, at the extremity of said downward movement, carrying the base flange of the valve stem 128 into face to face engagement with the wall of tube 130, as shown in Figure 6. Because the valve stem is held by the chuck in axial alignment with the punch 82, it follows that the valve stem will be positioned accurately upon the tube wall 130, in axial alignment with the aperture 137 therein. After downward movement of the chuck has applied the valve stem to the tube wall, continuing downward movement of the chuck first results in moving the chuck cup 98 into face to face engagement with the presser pad 123, against the force of springs 124, and thereafter results in the movement of the chuck barrel 77 relatively of said chuck cup. Such relative movement of chuck barrel and chuck cup causes the free ends of jaws 119 to spread and release their grip on the valve stem 128, and also causes the detent 104 to move into registry with the socket in the bushing 105 so that upon subsequent rise of the chuck the chuck barrel and chuck cup will retain the relative positions shown in Figures 1, 3, and 6.

After attaining its fully lowered position the slide 20 begins its rising movement, the mechanism then repeating the sequence of operations previously described whereby the shaft 32 is rotated through 180° whereby the position of the chuck and punch structure is reversed, to bring the chuck uppermost. During the foregoing operations the gear 18 has been driving the pinion 25 and cam 26 thereon, and as the slide 20 reaches the top of its second rising movement the pinion 25, which rotates at half the speed of gear 18, completes 360° of rotation and thus brings cam 26 into operative engagement with the switch 28 thereby opening the electric circuit of the motor 13 and bringing the latter to a stop. This completes a cycle of operation which may be repeated as often as the operator is able to remove the assembled work from the apparatus and replace it with other work pieces.

Referring to Figure 10 it will be seen that opening of limit switch 28 de-energizes relay 166 and thus results in opening switch 168 and switch 171. Opening of switch 171 de-energizes relay 154 and causes the latter to open switch 153 in the power conductors to motor 13, and to close switch 174 in the dynamic brake circuit 173, thus energizing time relay 176 and causing it to close switch 175 in circuit 173. When relay 160 is thus energized it closes switches 159 in the dynamic brake circuit and dynamic braking is applied to motor 13 to prevent over-run. Relay 160 also opens switch 165, the arrangement providing a safety factor to prevent starting of the motor while the dynamic brakes are applied. After a determinate brief time interval, during which the motor 13 is brought to rest, time relay 176 automatically is de-energized and opens switch 175, whereupon relay 160 is de-energized and opens switch 159 and closes switch 165, thus restoring the circuit to the inoperative condition shown.

The invention saves time and labor in the manufacture of inner tubes, it produces a superior product as the result of accurate positioning of the valve stem upon the tube, and it achieves the other advantages set out in the foregoing statement of objects.

Modification may be resorted to without departing from the spirit of the invention or the scope thereof as defined by the appended claims.

What is claimed is:

1. In apparatus of the character described, the combination of a vertically reciprocable slide, means for effecting cyclic operation of the slide, each cycle consisting of two descending and two rising movements, two work engaging mechanisms in axial alignment with each other carried by the slide, and means for moving said work-engaging mechanisms axially into engagement with the work in alternation during successive downward movements of the slide.

2. In apparatus of the character described, the combination of a vertically reciprocable slide, means for effecting cyclic operation thereof, each cycle consisting of two descending and two rising movements, a normally vertically disposed structure carried by the slide having work-engaging mechanisms at opposite ends thereof, and means for inverting the said structure in determinate relation to the reciprocation of the slide to present the work-engaging mechanisms to the work in alternation during each operative cycle of the slide.

3. In apparatus of the character described, the combination of a vertically reciprocable slide, means for effecting cyclic operation thereof, each cycle consisting of a plurality of descending and rising strokes, a horizontal shaft carried by said slide, a plurality of work-engaging mechanisms disposed in axial alignment transversely of the shaft carried by the latter, and means for rotating said shaft a determinate fraction of a revolution during reciprocation of the slide so as to present the work-engaging mechanisms to the work in succession.

4. In apparatus of the character described, the combination of a vertically reciprocable slide, means for effecting cyclic operation thereof, each cycle consisting of two descending and two rising movements, a horizontal shaft carried by the slide, a chuck and punch structure carried by the slide, means for turning said structure to reverse the positions of the chuck and punch in determinate relation to the reciprocations of the slide, and means operated by the reciprocation of the slide for causing said chuck to grip a work-piece mounted therein.

5. A combination as defined in claim 4 including means operated by pressure against the end of the chuck for causing the chuck to release its grip on the work-piece carried thereby.

6. Apparatus of the character described comprising a reciprocable head, a punch and a chuck mounted in axial alignment upon said head, and means for rotating said head on an axis that is transverse to the axis of the punch and chuck, in determinate time relation to the reciprocation of the head, to reverse the positions of the chuck and punch with relation to the work.

7. Apparatus of the character described comprising a chuck normally disposed on a vertical axis adapted to receive a work piece in one end thereof, means for reciprocating said chuck in a vertical direction toward and away from a second work piece, and means for reversing the position of the chuck during movement away from the second work-piece whereby the first work-piece is presented to the second work-piece during alternate reciprocations of the chuck.

8. Apparatus of the character described comprising a chuck normally disposed on a vertical axis adapted to receive a work-piece in one end thereof, means for reciprocating said chuck in a vertical direction toward and away from a second work-piece, means for reversing the position of the chuck during movement away from the second work-piece whereby the first work-piece is presented to the second work-piece during alternate reciprocations of the chuck, and means causing the chuck to grip the first work-piece and subsequently to release the same in determinate relation to the reciprocation of the chuck.

9. Apparatus of the character described comprising a chuck normally disposed on a vertical axis adapted to receive a work-piece in one end thereof, means for reciprocating said chuck in a vertical direction toward and away from a second work-piece, means for reversing the position of the chuck during movement away from the second work-piece whereby the first work-piece is presented to the second work-piece during alternate reciprocations of the chuck, said chuck comprising members movable axially relatively of each other, means actuated by relative movement of said chuck-members for gripping the work-piece therein, and means for effecting relative axial movement of said chuck members in determinate relation to the reciprocation movement of the chuck as a whole to cause said gripping means first to grip the work-piece in the chuck and subsequently to release the same.

10. Apparatus of the character described comprising a chuck adapted to receive a work-piece, means for advancing said chuck toward a second work-piece and for retracting it therefrom, said chuck comprising means for gripping the work-piece therein, means actuated by the movement of the chuck toward the second work-piece for causing the gripping means to engage the first work-piece, and means utilizing the pressure of the chuck against the second work-piece for causing the gripping means to release said first work-piece.

11. Apparatus of the character described comprising a chuck adapted to receive a work-piece, means for advancing said chuck toward a second work-piece and for retracting it therefrom, said chuck comprising members movable axially relatively of each other, gripper jaws in the chuck operated by relative movement of said chuck members, means for effecting relative movement of said members in one direction during the advancing movement of the chuck as a whole toward the second work-piece to cause the jaws to grip the first work-piece, and means actuated by the pressure of the chuck against the second work-piece for effecting relative movement of the chuck members in the direction that releases the gripper jaws from the first work-piece.

12. Apparatus of the character described comprising a tubular chuck adapted to receive a co-axially disposed work-piece, means for advancing said chuck toward a second work-piece and for retracting it therefrom, said chuck comprising two members movable axially relatively of each other, work-gripper jaws in the chuck operated by relative movement of said chuck members, yielding means normally urging said chuck members to relative movement in one direction, releasable means restraining movement of said chuck members, and means actuated by the movement of the chuck as a whole for operating said releasable means.

13. Apparatus of the character described comprising a tubular chuck adapted to receive a co-axially disposed work-piece, means for advancing said chuck toward a second work-piece and for retracting it therefrom, said chuck comprising two tubular members arranged in telescopic relation and capable of limited relative axial movement, work-gripper jaws carried by one of said members and operated by relative movement of the aforesaid chuck members, a compression spring between said telescoped members urging them to relative movement in one direction, a detent restraining said movement, and means actuated by the movement of the chuck as whole toward the second work-piece for disengaging said detent.

14. Apparatus as defined in claim 13 in which the last mentioned means comprises a pin operating against the detent, a lever carried by the chuck and arranged to effect movement of said pin, said lever including a cam surface, and a cam roller mounted in fixed position in the path of the cam surface of said lever and engaging the latter as the chuck as a whole is moved toward the second work-piece.

RAY D. HULSLANDER.